UNITED STATES PATENT OFFICE.

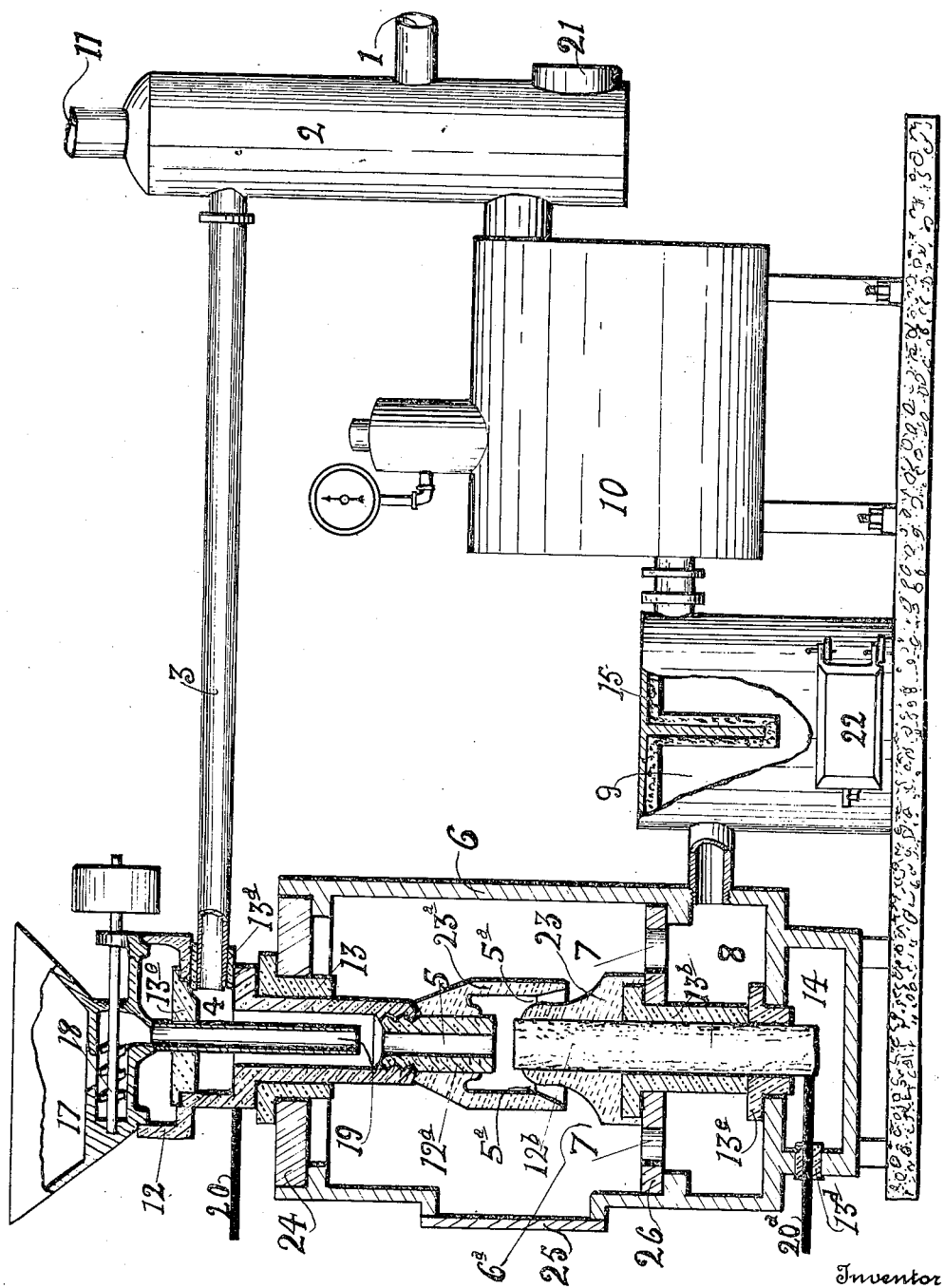

JULIUS A. PICKENS, OF EASLEY, SOUTH CAROLINA.

ELECTRIC FURNACE.

1,337,156.   Specification of Letters Patent.   Patented Apr. 13, 1920.

Application filed June 14, 1919. Serial No. 304,230.

*To all whom it may concern:*

Be it known that I, JULIUS A. PICKENS, a citizen of the United States, residing at Easley, in the county of Pickens and State of South Carolina, have invented certain new and useful Improvements in Electric Furnaces, of which the following is a specification.

This invention relates to an electric furnace of novel construction and is to be used in the art of nitrogen fixation, also in the deoxygenization of substances other than the atmosphere.

As a primary object, the invention aims to provide an arrangement and construction of the electrodes and combustion chamber whereby every atom of the atmosphere or substance treated is brought in contact with and forced to move through the flame of an electric arc.

A further object, is to provide a mechanism whereby the atmosphere to be utilized in the manufacture of nitrogen gas is impregnated with carbon dust or a spray of one of the many varieties of the hydrocarbon series for the purpose of facilitating complete combustion of the oxygen element.

With the foregoing and other objects in view which will appear as this description proceeds, it will be seen by those skilled in the art to which it appertains, that modifications thereof and changes in the precise embodiment of this invention can be made, within the scope of what is claimed in the fixation art of atmospheric nitrogen, also, in the deoxygenization of substances other than the atmosphere, without departing from the invention herein disclosed.

That my invention be fully understood, attention is directed to the accompanying drawing that shows a diametrical, longitudinal view, illustrating a vertical section of the construction of the combustion chamber and its electrodes, and its attachment to the economizing apparatus, said drawing forming a part of the specifications.

In explaining the mechanism and the method and process of operating the herein described invention, only the process of manufacturing nitrogen gas from the atmosphere will be referred to.

The air entering at 1, flows through the economizer 2, thence through the pipe 3 into the chamber 4 of the electrode 12. Flowing downward through 4 it enters the aperture 5, of the electrode point $12^a$, flowing through 5 into the center of the flame of the arc formed between the points of the hollow electrode $12^a$ and the solid electrode $12^b$; the bodies of $12^a$ and $12^b$ are protected from the heat of the arc by the refractory shields 23 and $23^a$; 23 and $23^a$, being of conical shape with 23 partially nested into $23^a$, deflect the arc downward through the aperture $5^a$ $5^a$ into the combustion compartment $6^a$, of the combustion chamber 6.

Deoxygenization being thus effected the gas flows through the apertures 7 7, into the collection chamber 8, thence into the settling chamber 9; 9 being a tank with its interior heavily insulated with a non-conducting material of heat 15, and equipped with a clean-out-door 22, is for the purpose of arresting the flow of the heavy ash forming in the combustion chamber.

The nitrogen gas being freed of its accompanying ash and yet retaining the temperature generated in 6, flows out of 9 into the steam generator 10, from 10 it enters the economizer 2 where its remaining temperature is utilized to raise the temperature of the air flowing to the combustion chamber. The nitrogen gas being divested of its acquired temperature flows through the pipe 11 to the fixation chambers.

The combustion chamber and its mechanical appurtenances are designed with a view of utilizing the maximum heat of the arc, and to facilitate the deoxygenization of the atmosphere it is impregnated with dust of carbon, coal oil or illuminating gas; the mechanism here shown being for the use of carbon dust and consisting of a hopper 17, a distributing mechanism 18 and the feed tube 19, though, it is to be understood that a modification of 19 adapting it to the use of gaseous or liquid combustibles is optional within the spirit of this invention.

Parts of the mechanism not mentioned in the foregoing description are designated as follows:

The lid to the arc chamber by numeral 24, the observation door of the arc chamber by 25; the partition between the arc chamber and the collection chamber by 26; the air tight chamber wherein is installed a mechanism for feeding the solid carbon into the arc chamber (said mechanism not shown) is designated by 14; the insulation of the electrodes from electrical contact with the surfaces of other parts of the mechanism is effected by 13, $13^a$, $13^b$, $13^c$, and $13^e$; the insulation of 20ᵃ is effected by 13ᵈ; the cleanout door of the economizer by 21.

As the mechanism of the herein described invention can be modified to deoxygenize substances other than the atmosphere, the lining in the illustration of the combustion chamber is omitted as unnecessary detail.

And I would have it understood that methods of operating the herein described invention and the installation of linings impervious to the action of the heat and the substance treated, be contemplated as coming within the scope of claims appended hereto.

I claim:—

1. The combination, in an electric furnace, of a combustion chamber equipped with an electrode having an aperture and chambered opening, longitudinally through its central portion and mating its point with the point of an electrode of solid construction, means of insulating said electrodes from electric contact with the surface of said combustion chamber and means of conveying an electric current into said electrodes, substantially as described.

2. The combination, in an electric furnace, of a combustion chamber fitted with an electrode having an aperture and chambered opening, longitudinally through its central portion and said chambered opening communicating through an impregnating tube with a hopper and distributing mechanism, substantially as described.

3. The combination, in an electric furnace, of a combustion chamber equipped with an electrode having a chambered opening longitudinally through its central portion, said chambered opening having communication by means of a tube with a liquid fuel tank, said tube and chambered opening having communication through a restricted aperture at the point of said electrode with and into the flame of an electric arc, substantially as described.

4. The combination, in an electric furnace, of a combustion chamber fitted with a hollow and a solid electrode, said electrodes being slipped into and protected by deflecting shields, substantially as described.

5. The combination, in an electric furnace, of a combustion chamber having three compartments, comprising the arc chamber, the collection chamber and the chamber containing the mechanism for striking and maintaining the arc, substantially as specified.

6. The combination, in an electric furnace, of a combustion chamber communicating with a collection chamber through apertures circumadjacent the solid electrode, thence through an insulated settling chamber, thence through a steam generator, thence through an economizer, thence through a pipe leading to the fixation chambers, all substantially as set forth.

In testimony whereof I hereunto set my hand.

JULIUS A. PICKENS. [L. S.]

Witnesses:
WALTER F. HESTER,
W. L. PICKENS.